United States Patent
Dieckmann et al.

(10) Patent No.: US 12,469,302 B2
(45) Date of Patent: Nov. 11, 2025

(54) METHOD AND ENVIRONMENT-CAPTURE SYSTEM FOR PRODUCING AN ENVIRONMENTAL IMAGE OF AN ENTIRE MULTI-PART VEHICLE

(71) Applicant: ZF CV SYSTEMS EUROPE BV, Brussels (BE)

(72) Inventors: Thomas Dieckmann, Pattensen (DE); Tobias Klinger, Springe (DE); Ralph-Carsten Luelfing, Garbsen (DE); Tobias Werle, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 107 days.

(21) Appl. No.: 18/549,358

(22) PCT Filed: Mar. 1, 2022

(86) PCT No.: PCT/EP2022/055073
§ 371 (c)(1),
(2) Date: Sep. 7, 2023

(87) PCT Pub. No.: WO2022/194532
PCT Pub. Date: Sep. 22, 2022

(65) Prior Publication Data
US 2024/0177495 A1 May 30, 2024

(30) Foreign Application Priority Data
Mar. 18, 2021 (DE) .................. 10 2021 106 670.0

(51) Int. Cl.
*G06V 20/56* (2022.01)
*G06T 5/50* (2006.01)
*G06V 10/74* (2022.01)

(52) U.S. Cl.
CPC ............... *G06V 20/56* (2022.01); *G06T 5/50* (2013.01); *G06V 10/761* (2022.01); *G06T 2207/20221* (2013.01)

(58) Field of Classification Search
CPC ........ G06V 20/56; G06V 10/761; G06T 5/50; G06T 2207/20221; G06T 3/4038;
(Continued)

(56) References Cited

U.S. PATENT DOCUMENTS 6,923,080 B1 * 8/2005 Dobler ................. G01S 13/931
348/E7.086
9,446,713 B2 * 9/2016 Lu ........................... B60R 1/002
(Continued)

FOREIGN PATENT DOCUMENTS

DE          10035223 A1   1/2002
DE       102007032720 A1   1/2009
(Continued)

*Primary Examiner* — Brian P Yenke
(74) *Attorney, Agent, or Firm* — LEYDIG, VOIT & MAYER, LTD.

(57) ABSTRACT

A method for producing an environmental image of an entire multi-part vehicle having a tractor vehicle and at least one trailer vehicle includes providing an image capture device including a front camera for capturing a front capture region in front of the tractor vehicle and outputting a front individual image, front lateral cameras for capturing front lateral capture regions and outputting front lateral individual images, back lateral cameras for capturing back lateral capture regions and outputting back lateral individual images, and a rear camera for capturing a back capture region behind the trailer vehicle and outputting a back individual image. The method includes recording the individual images with the cameras, evaluating and/or cropping the individual images such that overlap regions are in each case formed at least between the front lateral individual (Continued)

images and the back lateral individual images, and combining the individual images to form the environmental image.

22 Claims, 5 Drawing Sheets

(58) Field of Classification Search
CPC ............ B60R 1/002; B60R 2300/105; B60R 2300/202; B60R 2300/303; B60R 2300/304; B60R 2300/802
See application file for complete search history.

(56) References Cited

U.S. PATENT DOCUMENTS

| | | | | |
|---|---|---|---|---|
| 9,860,445 | B2* | 1/2018 | Kuehnle | G06V 20/56 |
| 10,397,524 | B1* | 8/2019 | Wu | H04N 7/181 |
| 10,699,376 | B1* | 6/2020 | Kwok | B60R 1/28 |
| 11,142,174 | B2* | 10/2021 | Plaehn | B60T 7/20 |
| 11,318,884 | B2* | 5/2022 | Smits | H04N 23/90 |
| 11,783,598 | B2* | 10/2023 | Luo | B60D 1/62 |
| 11,813,910 | B2* | 11/2023 | Klinger | B62D 15/02 |
| 11,919,498 | B2* | 3/2024 | Plaehn | B60T 8/1708 |
| 12,043,307 | B2* | 7/2024 | Wulf | B60D 1/62 |
| 12,050,100 | B2* | 7/2024 | Joshi | G01S 7/4817 |
| 12,116,059 | B2* | 10/2024 | Heseding | B60D 1/62 |
| 12,236,637 | B2* | 2/2025 | Ricke | H04N 23/695 |
| 2008/0122597 | A1* | 5/2008 | Englander | B60Q 1/249 |
| | | | | 348/E7.086 |
| 2012/0188499 | A1 | 7/2012 | Nakai et al. | |
| 2013/0236858 | A1 | 9/2013 | Lin et al. | |
| 2015/0286878 | A1* | 10/2015 | Molin | G01B 11/022 |
| | | | | 348/148 |
| 2016/0150189 | A1 | 5/2016 | Kriel et al. | |
| 2016/0300113 | A1* | 10/2016 | Molin | G06V 20/58 |
| 2016/0301863 | A1 | 10/2016 | Petrany et al. | |
| 2017/0036602 | A1* | 2/2017 | Kröll | H04N 7/181 |
| 2017/0132476 | A1* | 5/2017 | Chien | H04N 23/698 |
| 2017/0166132 | A1* | 6/2017 | Nemeth | B60R 11/04 |
| 2017/0272664 | A1* | 9/2017 | Lang | B62D 13/06 |
| 2017/0341583 | A1* | 11/2017 | Zhang | H04N 7/181 |
| 2018/0063427 | A1 | 3/2018 | Ali et al. | |
| 2018/0141496 | A1* | 5/2018 | Loehr | G06V 20/20 |
| 2018/0186290 | A1* | 7/2018 | Ward | H04N 7/181 |
| 2018/0244199 | A1* | 8/2018 | Gyori | G06T 3/4038 |
| 2019/0299859 | A1* | 10/2019 | Lu | H04N 23/698 |
| 2019/0325233 | A1* | 10/2019 | Broll | B60R 11/04 |
| 2020/0086791 | A1* | 3/2020 | Hardy | G06T 3/4038 |
| 2021/0053490 | A1* | 2/2021 | Smits | H04N 7/18 |
| 2021/0061173 | A1* | 3/2021 | Weinlich | B60R 1/26 |
| 2021/0185635 | A1* | 6/2021 | Dieckmann | G05D 1/695 |
| 2022/0072997 | A1* | 3/2022 | Berne | B60R 1/25 |
| 2022/0144187 | A1* | 5/2022 | Sperrle | B60W 30/06 |
| 2022/0153195 | A1* | 5/2022 | Freeman-Powell | G06T 7/33 |
| 2022/0161619 | A1* | 5/2022 | Klinger | B60D 1/62 |
| 2022/0258800 | A1* | 8/2022 | Zimmermann | B60R 11/04 |
| 2022/0414927 | A1* | 12/2022 | Ricke | B60R 11/04 |
| 2023/0064558 | A1* | 3/2023 | Griffin | B60K 35/28 |
| 2023/0196609 | A1* | 6/2023 | Klinger | B60D 1/62 |
| | | | | 701/28 |
| 2024/0331193 | A1* | 10/2024 | Klinger | G06T 7/55 |
| 2024/0412410 | A1* | 12/2024 | Klinger | G06T 7/75 |
| 2024/0430574 | A1* | 12/2024 | Burns | H04N 23/90 |
| 2025/0162502 | A1* | 5/2025 | Schaub | B60R 1/26 |

FOREIGN PATENT DOCUMENTS

| | | |
|---|---|---|
| DE | 102016212620 A1 | 1/2018 |
| JP | 2012155158 A | 8/2012 |
| WO | WO 2013032371 A1 | 3/2013 |

* cited by examiner

METHOD AND ENVIRONMENT-CAPTURE SYSTEM FOR PRODUCING AN ENVIRONMENTAL IMAGE OF AN ENTIRE MULTI-PART VEHICLE

CROSS REFERENCE TO RELATED APPLICATIONS

This application is a U.S. National Phase application under 35 U.S.C. § 371 of International Application No. PCT/EP2022/055073, filed on Mar. 1, 2022, and claims benefit to German Patent Application No. DE 10 2021 106 670.0, filed on Mar. 18, 2021. The International Application was published in German on Sep. 22, 2022 as WO 2022/194532 A1 under PCT Article 21(2).

FIELD

Embodiments of the present invention provide methods and systems for producing an environmental image of a multi-part vehicle.

BACKGROUND

Driver assistance systems often enable representations of the vehicle environment, e.g. on a screen in the driver's field of view. The driver can thus have a view of the vehicle environment from the driver's seat during maneuvering of the vehicle, in particular during reversing, cornering and e.g. also when docking to loading platforms and during loading operations.

In particular, a comprehensive representation of the vehicle environment on the screen, in particular also in a top view, is advantageous in this case. Individual regions, such as e.g. the region behind a vehicle rear, can be captured by an individual camera, which thus supplies an individual image. Larger environmental regions can generally only be captured by a plurality of cameras attached to the vehicle at different points, the individual images from said cameras subsequently being combined. For the representation of a surround view-top view image, i.e. a comprehensive representation of the vehicle environment around the vehicle, cameras are thus generally provided on the four exterior surfaces, i.e. on the front side or front, the rear side or the rear region, and the two lateral surfaces. Since the individual camera positions are static relative to the coordinate system of the vehicle, the individual images captured by the individual cameras in their capture regions can subsequently be projected as top views, i.e. component top views, and be combined to form a surround view.

Problems occur, however, in the case of relatively long vehicles or vehicles comprising a plurality of individual components connected in an articulated manner relative to one another. Problems occur here particularly in the case of entire multi-part vehicles comprising a tractor vehicle and towed components connected in an articulated manner relative to the tractor vehicle.

Hereinafter, a component towed by the tractor vehicle and connected in an articulated manner relative to the tractor vehicle is referred to generally as a trailer vehicle; the latter can thus be in particular a semitrailer or a drawbar trailer, but also e.g. a subframe. Moreover, the entire vehicle can have a plurality of trailer vehicles hitched one behind another.

In the case of entire multi-part vehicles, the articulation angles between the individual vehicles generally change dynamically during travel. An articulation angle can generally be defined as the angle between the longitudinal axes of the individual vehicles. In the case of relatively long entire vehicles, cameras can be attached not only to the tractor vehicle but also to the at least one trailer vehicle in order to capture the vehicle environment next to and behind the trailer vehicle as well. The ascertainment of an environmental image of the entire vehicle from images recorded by the plurality of cameras is correspondingly complex, also owing to possible concealments of the environment from the respective camera perspective.

JP 2012 155158 A discloses the representation of a surround view for a semitrailer truck with a dynamically variable articulation angle. In that case, a component top view of the tractor vehicle is aligned according to the articulation angle with respect to the top view of the trailer. The component top view of the tractor vehicle is allocated a higher priority, the color information of the top view being overwritten in order to enable a representation substantially without gaps, i.e. a representation of the surround view in mutually adjoining image regions with the smallest possible gaps. After the rotation of a component top view, however, regions in the represented image can also arise which are not filled with image information of the cameras, but rather are colored monotonically, and so once again a representation without gaps does not occur.

SUMMARY

In an embodiment, the present disclosure provides a method for producing an environmental image of an entire multi-part vehicle having a tractor vehicle and at least one trailer vehicle. The method comprises providing an image capture device comprising a front camera on a front side of the tractor vehicle for capturing a front capture region in front of the tractor vehicle and outputting a front individual image, front lateral cameras on the tractor vehicle for capturing front lateral capture regions and outputting front lateral individual images, back lateral cameras on the trailer vehicle for capturing back lateral capture regions and outputting back lateral individual images, and a rear camera on a rear region of the trailer vehicle for capturing a back capture region behind the trailer vehicle and outputting a back individual image. The method further comprises recording the individual images with the cameras and evaluating and/or cropping the individual images such that overlap regions are in each case formed at least between the front lateral individual images and the back lateral individual images. The method further comprises combining the individual images to form the environmental image, which represents an environment around the entire vehicle, taking account of an articulation angle and/or matching of the individual images in the overlap regions.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
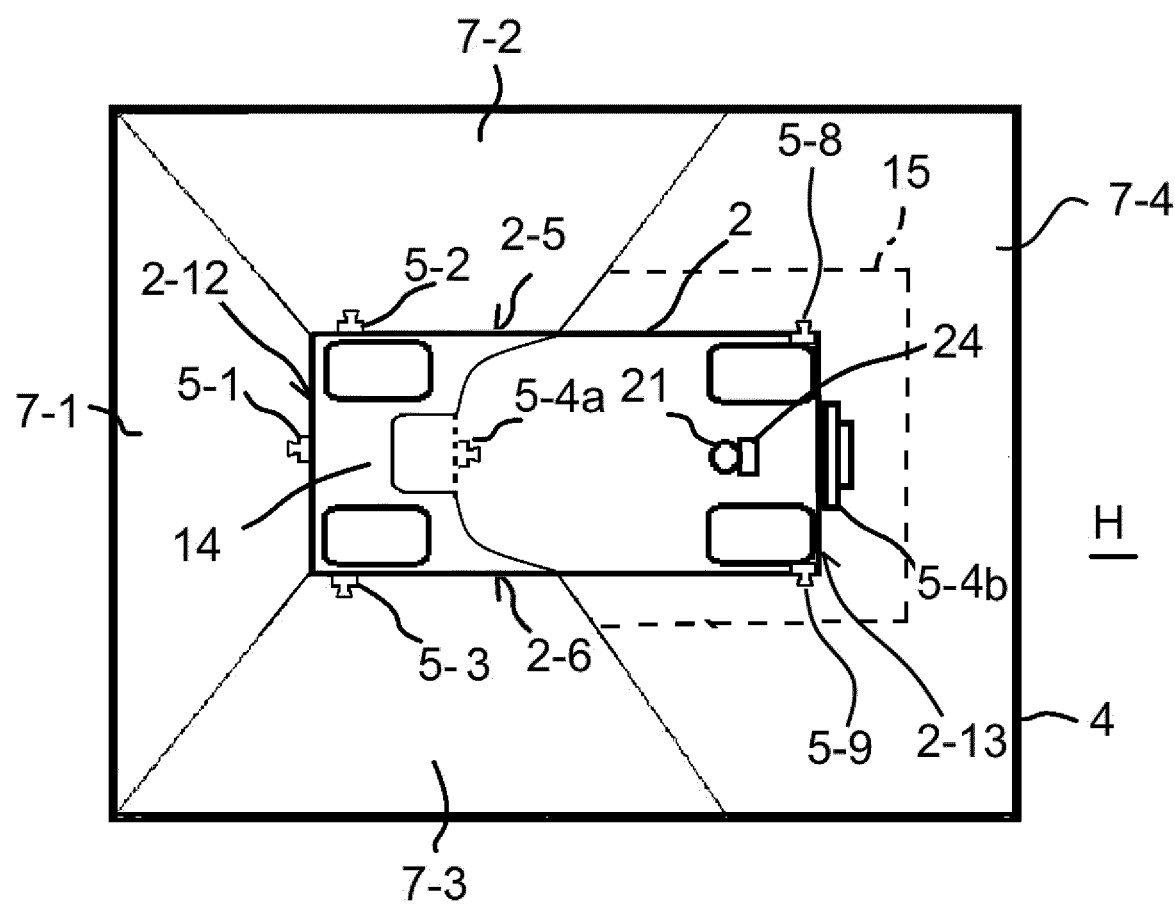
FIG. 1 shows the illustration of a semitrailer tractor as a tractor vehicle with cameras and capture regions of the cameras.

An embodiment of the invention provides a method and an apparatus for producing an environmental image of an entire multi-part vehicle which enable a reliable representation of the vehicle environment under different driving conditions with relatively little outlay.

In an embodiment, a method and an environment-capture system are provided. Furthermore, an entire multi-part vehicle comprising the environment-capture system is provided.

According to an embodiment of the invention, firstly it is recognized that the images from the cameras on the trailer vehicle, in particular rear cameras for capturing a back region behind the trailer vehicle, cannot be statically converted to the coordinate system defined e.g. by the tractor vehicle. Furthermore, it is recognized that, in the case of multi-part vehicles, in particular the concealed regions covered by the moving parts of the vehicles change as well. Consequently, e.g. during cornering, the effectively usable capture region of a front lateral camera may be partly concealed by the back component that is angled away. The representation of a concealed region e.g. by way of a different coloration is advantageously assessed according to an embodiment of the invention as off-putting for the driver since the latter will thereupon attempt e.g. to view concealed regions directly by way of the exterior mirrors, which may thus result in hazardous situations.

According to an embodiment of the invention, in each case at least one camera, in particular exactly one camera, is provided on the outwardly directed surfaces of the entire vehicle, i.e. the front side and the lateral surfaces of the tractor vehicle, and also the rear side or rear surface and the lateral surfaces of the trailer vehicle, the cameras supplying individual images. In this case, overlap regions are formed at least between the front and back lateral cameras, which overlap regions are thus captured by both cameras.

The overall image created from the individual images, i.e. the environmental image around the entire vehicle, can be created in particular as a surround view-top view image. In this case, the individual images can firstly be projected as a top view, i.e. as individual component top views, which are then combined to form the entire surround view-top view image; and as an alternative to this, it is also possible for the individual images firstly created by the outwardly directed cameras to be combined to form the overall image, i.e. a surround view from the viewpoint of the vehicle, from which the surround view-top view image is then projected.

Consequently, images from the rear camera on the rear side of the tractor vehicle and from a front camera on the front side of the trailer vehicle are advantageously not included in the surround view. That is based on the consideration that the capture regions of these cameras are at least substantially shaded or concealed by the respectively other vehicle, and consequently it is not just the case that little additional information is obtained from these individual images; rather, according to an embodiment of the invention, it is also recognized here that these individual images can even lead to incorrect information since the respective components of the other vehicle directly in front of the camera can lead to perspective projections according to which these components are projected as too large, and so an environmental image created with these additional individual images around the entire vehicle with additional individual images of the partly concealed inner surfaces is recognized as more complex and tending to be more susceptible to errors.

The capture regions of the individual cameras are thus chosen to be large enough; advantageously, the capture regions of the lateral cameras extend in a direction toward the respectively other vehicle, i.e. the capture region of the front lateral cameras on the tractor vehicle backward and correspondingly the capture regions of the back lateral cameras on the trailer vehicle forward, along the lateral surfaces of the entire vehicle, i.e. without a or without a relevant dead space or concealed region. The lateral cameras are thus attached to the exterior side of the individual vehicles, for example. In this case, the back lateral cameras are attached for example to the back end of the lateral surface, i.e. in or on a back corner region of the trailer vehicle, and correspondingly the front lateral cameras are attached to a front end of the lateral surface of the tractor vehicle, i.e. in or on front corner regions of the tractor vehicle, thus yielding in the respectively other direction the environmental regions on the vehicle, and also forward another relevant capture region. Other mounting points are also possible, in particular as long as the visible region of the lateral cameras overlaps the capture region of the front or respectively rear camera and the lateral cameras of the respectively hitched component, thereby enabling a representation of the environment around the vehicle that is as uninterrupted as possible.

Between the two lateral individual images, i.e. between the left front lateral camera and the left back lateral camera or the capture regions thereof and thus the individual images captured thereby and correspondingly on the right side, in this case an overlap region is chosen which does not disappear even in the case of a relatively large articulation angle. For this purpose, the individual images captured by the cameras are advantageously firstly cropped in such a way that they have a relevant region in the respectively other longitudinal direction, such that the overlap region then forms from both lateral individual images.

Advantageously, overlap regions are also formed between the lateral individual images and the individual image formed in the longitudinal direction in respect of the individual tractor vehicles, i.e. the front lateral individual images and the front individual image of the front camera on the tractor vehicle, and correspondingly the back lateral individual images and the back individual image on the rear region of the trailer vehicle, which overlap regions are then preferably each inherently static. Consequently, an environmental image of the entire vehicle is formed which is captured peripherally continuously by way of individual images or overlap regions, with the result that no dead spaces are formed.

In accordance with a preferred embodiment, the overlap regions are fixed portions of the individual images and/or independent of the articulation angle. The overlap regions can thus be ascertained from the individual images or in the projections directly. This also ensures that no gaps occur in the environmental image.

The overlap regions are formed in particular by means of averaging or with processing of the information of both individual images. Advantageously, in principle, a priority is not accorded to one of the two images. In this case, the overall creation can be represented with color information, for which purpose the individual images are firstly assigned color information, which can then advantageously be averaged.

The lateral overlap regions can be produced differently depending on use on the vehicle. If the articulation angle between the individual vehicles is known, e.g. when an articulation angle sensor is used, or else when the articulation angle is ascertained from driving dynamics data of the vehicle, image information can thus be formed with the use of the articulation angle directly in the overlap regions. In this case, e.g. a cross-correlation can advantageously be formed supplementarily in order to ascertain an erroneousness of averaging thus produced or the quality.

If the articulation angle is not known, the lateral individual images can also be compared with one another, i.e. on each side in each case the front individual image and the back individual image. This comparison or relative assessment of the individual images can be effected in accordance with one or more embodiments:

In accordance with an embodiment, e.g. distinctive external objects can be captured or identified in the individual images and can be compared with one another in order thereby to obtain external reference points. This means, in particular, that this involves ascertaining whether the same external object in each case is captured in the individual images, in particular by means of distinctive points.

In accordance with an embodiment, the temporal profile of the individual images can be compared, i.e. the temporal sequence of structures or profiles in the images, which is also known as a tracker method.

As an alternative or in addition thereto, a cross-correlation or some other assessment of the matching of the individual pixels can also be effected through over the entire overlap region in order to produce extensive matching in the entire overlap region, and the region in which the cross-correlation coefficient produces an optimum value can thus be ascertained by the individual images being displaced step by step.

In particular, the normalized cross-correlation coefficient is a measure of the matching of respective overlap regions, i.e. in particular a value for the matching can thus be used for the articulation angle estimation between the components. If there is good matching of the overlap regions of the component top views (e.g. after a rotation of the top view of the trailer about the coupling point of both components), it is assumed that the angle of this rotation corresponds to the articulation angle.

Alternatively, the articulation angle can be determined by the rear camera by way of capturing the hitched vehicle component and/or the trailer. In this case, by means of image processing algorithms, for example, the relative position of the hitched vehicle component relative to the tractor vehicle can be tracked, or determined directly. The articulation angle is determined on the basis of the relative positions of the components with respect to one another.

Since the rear camera on the tractor vehicle is not used for the surround view, in particular, when the trailer is hitched, said rear camera can preferably also serve as an articulation angle sensor in the broadest sense. By means of image processing algorithms, for example, the front side or front of the trailer vehicle itself can be captured or tracked, wherein the position of the front side or front of the trailer vehicle can be determined directly, and/or the position of a pattern on the trailer vehicle can be determined, and/or the inclination of the trailer vehicle relative to the tractor vehicle can be detected by means of a further method.

As a result, other sensors can be replaced, or the articulation angle determined according to one of the other methods can be corrected/determined more precisely.

Consequently, with relatively little outlay, in particular also little hardware outlay, an environmental image of the entire vehicle can be produced which produces no or negligible dead spaces on the vehicle. In this regard, e.g. depending on the profiling of the exterior surfaces of the vehicles, if appropriate, a partial concealment of the regions situated quite close to the lateral surfaces can be provided; in these regions of e.g. a few centimeters next to the vehicle, however, a truck driver will generally not carry out any maneuvering operations.

Coloring of dead regions left free is advantageously not provided.

In the case of the apparatus according to an embodiment of the invention, the individual cameras and a control device are thus provided, which records, trims and combines the individual images, wherein the projection into the top view can be effected before or after the environmental image is produced.

Figure 2:
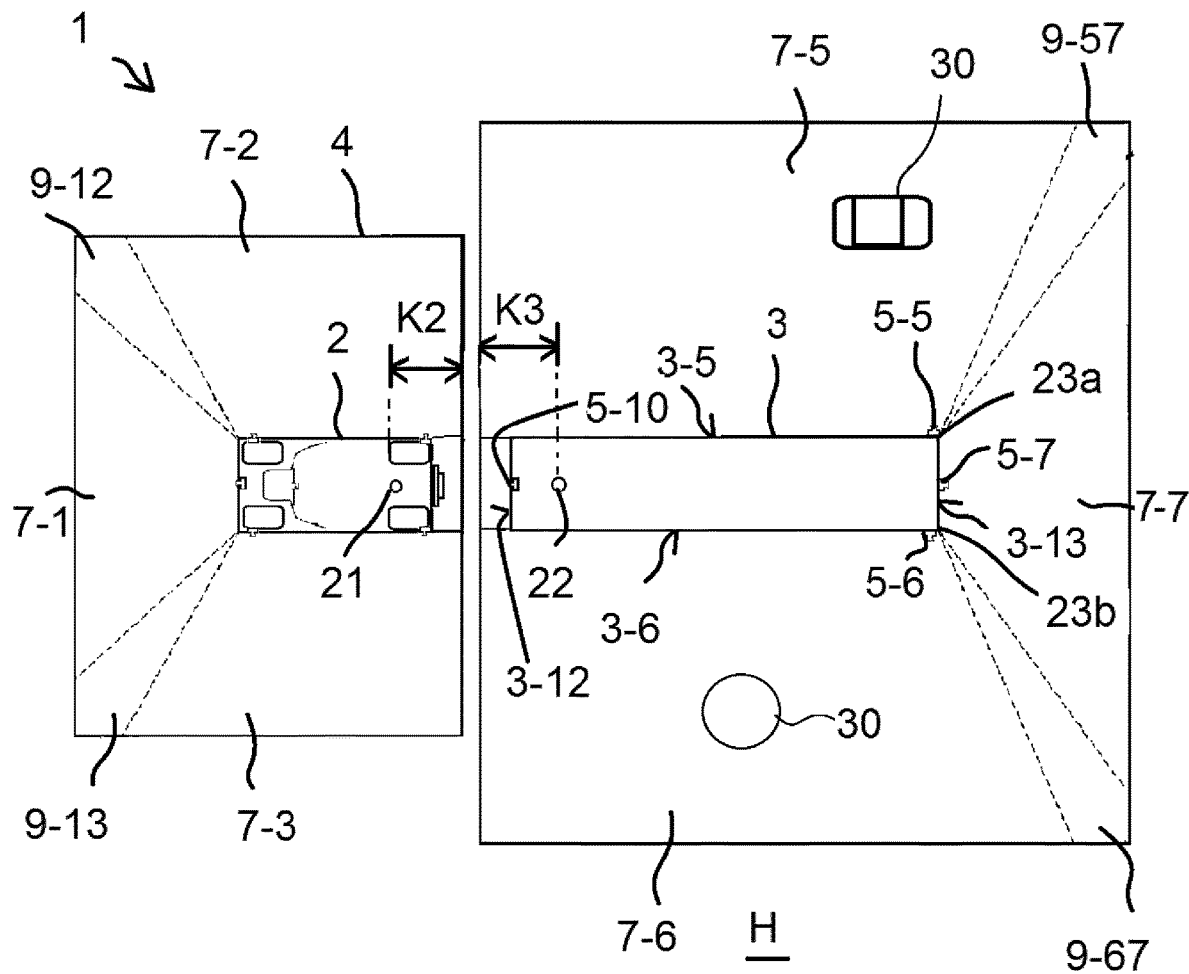
FIG. 2 shows an illustration of a semitrailer truck as an entire vehicle, with cameras, capture regions of the individual images of the cameras and of the overlap regions.

An entire multi-part vehicle 1, i.e. a vehicle combination, is embodied as a semitrailer truck in this embodiment, with a tractor vehicle 2 (semitrailer tractor) illustrated in FIG. 1 and a trailer vehicle 3, here therefore a semitrailer. FIG. 2 shows the two vehicles 2 and 3 separated, i.e. with the trailer vehicle 3 unhitched.

The tractor vehicle 2 is shown in greater detail in FIG. 1; it has an image capture device 6, which in turn has:
- a front camera 5-1 attached to a front side 2-12 of the tractor vehicle 2, in particular behind the windshield, e.g. also to the rear-view mirror, but also to the exterior surface, the front camera 5-1 capturing a front capture region 7-1 in an environment 4 of the entire vehicle 1, two front lateral cameras 5-2 and 5-3,
- i.e. a right front lateral camera 5-2 on a right lateral region 2-5 of the tractor vehicle 2 and a left front lateral camera 5-3 on a left lateral region 2-6 of the tractor vehicle 2, the two front lateral cameras 5-2 and 5-3 capturing lateral front capture regions 7-2 and 7-3, i.e. toward the right and left, of the tractor vehicle 2,
- and also rear cameras 5-4a and 5-4b, which together with the optional back lateral cameras 5-5 and 5-6 of the trailer vehicle capture a back capture region 7-4 in the environment 4 of the tractor vehicle 2. In the case of the tractor vehicle 2 embodied as a semitrailer tractor, the rear camera 5-4a is attached for example to the back region of the driver's cab 14; generally a rear camera 5-4b can be provided on the rear region 2-13 of the tractor vehicle 2.

Figure 5:
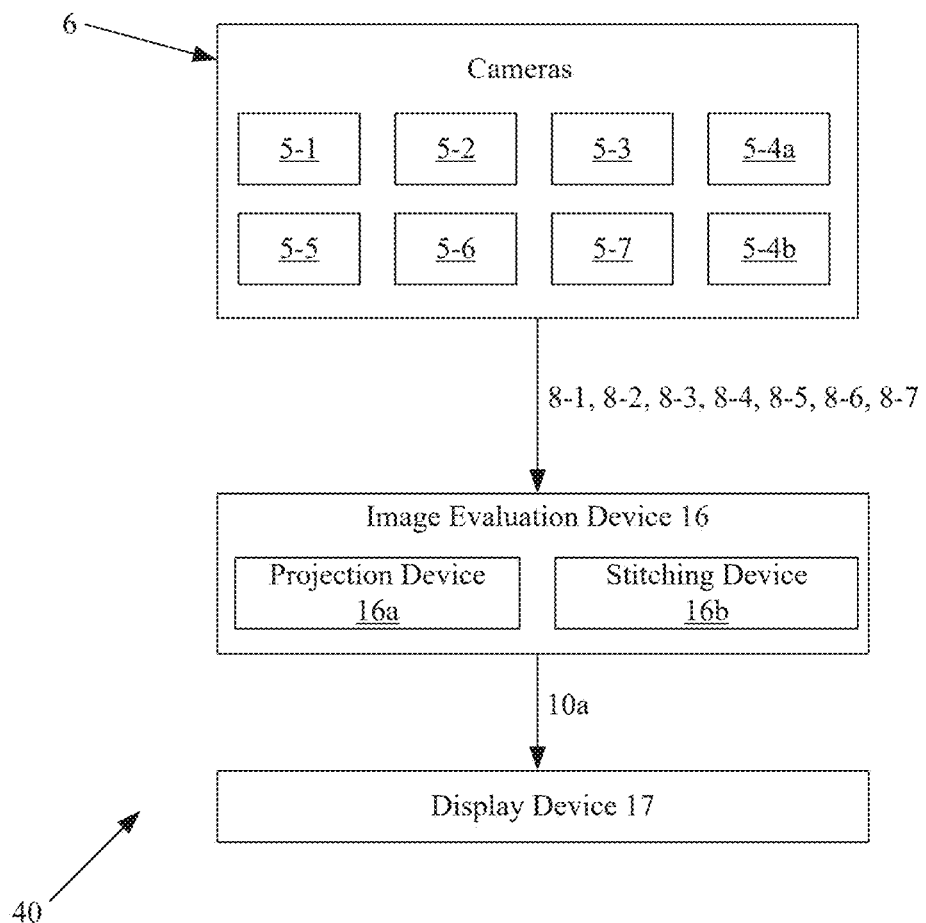
FIG. 5 shows a block diagram of an environment-capture system according to an embodiment of the invention.

The cameras 5-1, 5-2, 5-3, 5-4a, 5-4b, 5-5 and 5-6 respectively output individual images 8-1, 8-2, 8-3, 8-4a, 8-4b, 8-5 and 8-6 to an image evaluation device 16 provided in the tractor vehicle 2, the image evaluation device being shown in FIG. 5, which individual images, in the case of the subdivision of the environment 4 shown, can be put together directly or with little overlap in order to produce an environmental image, here in particular a surround view-top view image 10a of the tractor vehicle 2, which reproduces the environment 4 around the tractor vehicle 2. The putting together and production of a combined image is generally referred to as stitching. The surround view-top view image 10a of the tractor vehicle 2 can be displayed in particular on a display device 17, in particular in the driver's cab 14 of the tractor vehicle 2.

The image capture device 6, the image evaluation device 16 and preferably also the display device 17 form an environment-capture system 40 of the entire vehicle 1.

Figure 3:
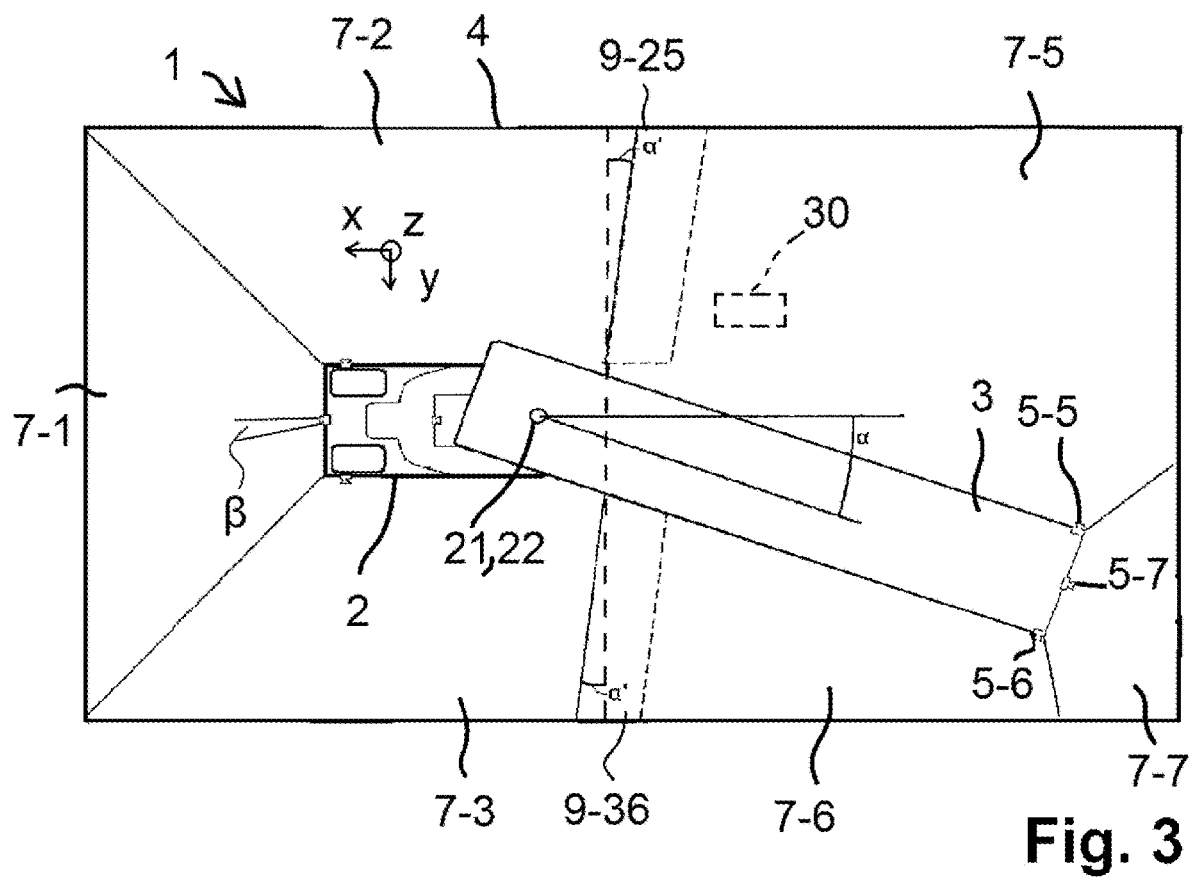
FIG. 3 shows an illustration of the semitrailer truck corresponding to FIG. 2 during cornering.

Advantageously, the cameras 5-1 to 5-3 have capture regions 7-1 to 7-3 with a large horizontal camera angle, which, in the horizontal plane H shown in FIGS. 1, 2, 3 in principle, as much as possible ranges to 180° or else enables e.g. even a camera angle of 190°, i.e. a fisheye embodiment. By contrast, the camera angle in the vertical direction V, in particular upward, can be made deliberately smaller.

During travel of the tractor vehicle 2 on its own, the formation of a surround view-top view image 10a (surround view, 360° image) of the tractor vehicle 2 is thus made possible, such that the driver obtains a view of the environment 4 of the tractor vehicle 2 directly during forward travel and during reversing, but also during cornering.

Since, in the example shown of a tractor vehicle as a semitrailer tractor 2, a rear camera 5-4a is arranged in the region of the driver's cab 14 and the back rear region of the vehicle 2-13 thus lies behind and below the rear camera 5-4a, this rear region 2-13, which is therefore not situated on the same horizontal plane of the environmental model, but rather thereabove, is represented in excessively large fashion owing to the constraints of perspective. Therefore, it is projected into the perspective projection region 15 marked by dashed lines in FIG. 1, i.e. is represented in distorted and excessively large fashion in the surround view-top view image 10a of the tractor vehicle 2.

FIG. 2 illustrates the two vehicles 2 and 3 individually, i.e. with the trailer vehicle 3 unhitched. The trailer vehicle 3 has a right back lateral camera 5-5 on a right lateral surface 3-5 and a left back lateral camera 5-6 on a left lateral surface 3-6, and also a rear camera 5-7, which capture corresponding capture regions 7-5, 7-6, 7-7 and output individual images 8-5, 8-6 and 8-7 to the image evaluation device 16. The trailer vehicle 3 is preferably not equipped with a front camera 5-10—depicted here—or a front camera 5-10 optionally provided on the trailer vehicle 3 is advantageously not included. The back lateral cameras 5-5 and 5-6 are attached for example in corner regions 23a, 23b, i.e. at transition regions of the lateral surfaces 3-5 and 3-6 of the trailer vehicle 3 with the rear surface 3-13 of the trailer vehicle 3, the rear camera 5-7 being secured to said rear surface. No camera is secured to a front side 3-12 of the trailer vehicle 3, that is to say that a back front camera is absent, or a camera provided here is preferably not included in the method according to an embodiment of the invention; such a camera is preferably not required according to an embodiment of the invention for ascertaining the environmental image, i.e. here the surround view-top view image 10a of the entire vehicle 1.

In order to produce the environmental image, i.e. here the surround view-top view image 10a of the entire vehicle 1 (360° surround view), the individual images 8-1, 8-2, 8-3 and 8-5, 8-6 and 8-7 are once again stitched and projected, which is done by firstly producing a projection, i.e. top views of the individual images 8-i, and then stitching or combining them to form the surround view-top view image 10a, or else firstly stitching the individual images 8-1, 8-2, 8-3 and 8-5, 8-6 and 8-7 and then projecting them to form the surround view-top view image 10a.

Accordingly, in FIG. 5 a projection device 16a and a stitching device 16b are depicted as parts of the image evaluation device 16, which in principle can be traversed in both orders. Both are hereby concomitantly encompassed equivalently, including hereinafter.

In this case, the capture regions 7-i and thus the individual images 8-i are chosen with a size such that overlap regions 9a, 9b, 9c, 9d, 9e and 9f form between adjacent individual images 8-i, i=1, 2, 3, 5, 6, 7:

In this case, the formation of the capture regions 7-i is firstly symmetrical toward the left and right, such that a laterally symmetrical formation also arises in the case of the entire vehicle 1 during travel straight ahead according to FIG. 2. As is evident from FIG. 2, the camera angles or capture angles of the cameras 5-i are chosen with a magnitude such that sufficient overlap regions 9 arise:

In this regard, corresponding overlap regions 9-12 and 9-13 arise between the front capture region 7-1 of the tractor vehicle 2 and the lateral capture regions 7-2 and 7-3 of the tractor vehicle 2. Since the capture regions 7-1, 7-2 and 7-3 are provided in static or fixed fashion on the tractor vehicle 2, their overlap regions 9-12 and 9-13 are also fixed and can thus be ascertained directly in the individual images 8-1, 8-2 and 8-3 or in the projections.

The tractor vehicle rear cameras 5-4a and/or 5-4b, which in principle are likewise attachable or else provided on the tractor vehicle 2 in accordance with FIG. 1, are not used for forming the environmental image of the entire vehicle 1. Consequently, the tractor vehicle 2 for the formation of the entire vehicle 1 can in principle also be formed without such tractor vehicle rear cameras 5-4a and/or 5-4b. For unaccompanied travel of the tractor vehicle 2 by itself, however, the formation of a surround view-top view image 10a of the tractor vehicle 2 is once again made possible.

In the case of the trailer vehicle 3, overlap regions 9-57 and 9-67 once again arise between the individual images 8-5 and 8-6 of the lateral capture regions 7-5 and 7-6 of the trailer vehicle 3 and the individual image 8-7 of the back capture region or rear capture region 7-7, which overlap regions here are once again static with respect to one another since they are only recorded by cameras 5-5, 5-6 and 5-7 on the trailer vehicle 3.

When the trailer vehicle 3 is hitched by its kingpin receptacle 22 to the kingpin 21 of the tractor vehicle 2, the capture regions 7-3 and 7-6 on the left side and capture regions 7-2 and 7-5 on the right side of the entire vehicle 1, which are still depicted separately in FIG. 2, correspondingly overlap in corresponding overlap regions 9-25 and 9-36. As evident from FIG. 2, in this case camera angles are chosen which, in the direction toward the respectively other vehicle 2, 3 capture the entire region of the environment 4 next to the vehicles 2, 3. In this case, small instances of shading may possibly occur as a result of attachments or profilings of the lateral structures. In principle, however, what is made possible is capture of the environment 4 without a dead space or relevant dead space next to the entire vehicle 1, i.e. merely a dead region—technically irrelevant here—of a few centimeters next to the lateral surfaces, which therefore also correspond to a region in close proximity next to the entire vehicle 1, however, which is no longer relevant to the maneuvering or guiding of the entire vehicle 1 by the driver, since, in the case of an entire vehicle 1 of this size, no guiding to a few centimeters next to the entire vehicle 1 will take place.

During cornering in accordance with FIG. 3, an articulation angle $\alpha$ arises between the tractor vehicle axis A2 of the tractor vehicle 2 (longitudinal axis of the tractor vehicle 2) and the trailer vehicle axis A3 (longitudinal axis of the trailer vehicle 3). The articulation angle $\alpha$ can be measured directly if an articulation angle sensor 24 is present; furthermore, the articulation angle $\alpha$ can also be ascertained from driving dynamics control systems solely on the basis of driving dynamics data, in particular by way of wheel rotational speeds n of the individual wheels of both vehicles 2, 3, and, in the case of corresponding model designs, also by taking account of driving that has proceeded previously and the steering wheel lock. Such methods for ascertaining an articulation angle α from driving dynamics data are known as such.

As will additionally be described further below, the articulation angle α can however also be ascertained indirectly after or on the basis of the ascertainment of the environmental image of the entire vehicle 1.

If the articulation angle α is already known, the individual images 8-5, 8-6, 8-7 of the trailer vehicle 3 can be aligned according to the articulation angle α in relation to the individual images 8-1, 8-21, 8-3 of the tractor vehicle 2, which define the basic coordinate system—depicted as x, y, z in FIG. 3. The overlap regions 9-57 and 9-67 of the trailer vehicle 3 are static in relation to the trailer vehicle 3 and can once again be used for ascertaining the individual images 8-5, 8-6 and 8-7. By contrast, the lateral overlap regions 9-25 and 9-36 between the two vehicles 2, 3 change dynamically with the articulation angle α.

FIG. 3 shows the formation of the overlap regions 9-25 on the right side of the entire vehicle 1 and 9-36 on the left side of the entire vehicle 1; in this case, corresponding overlap regions 9-25 and 9-36 can be defined dynamically, e.g. with an overlap angle α'=α/2. In principle, these overlap regions can be chosen differently on the left and right and with a sufficient size in order to form an environmental image free of a dead space.

Since the lateral capture regions 8-2 and 8-3 of the tractor vehicle 2 and the lateral capture regions 8-5 and 8-6 of the trailer vehicle 3 already overlap considerably in the longitudinal direction, as can be seen from the separate representation in the case of straight ahead alignment of the vehicles 2 and 3 from FIG. 2, an overlap region 9-25 and 9-36 can in each case still be defined even in the case of relatively large articulation angles α. In this regard, the lateral capture regions 8-2 and 8-3 of the tractor vehicle 2 extend from the kingpin 21 in accordance with FIG. 2 backward across the distance K2 and correspondingly at the trailer vehicle 3 from the kingpin receptacle 22 forward across the distance K3, which, when the vehicles are hitched together, thus overlap by the distance K2+K3, such that there is still a sufficient overlap even in the lateral outer regions even in the case of relatively large articulation angles α.

If the vehicle geometry of the individual vehicles 2 and 3 is known, overlap regions 9-i can be defined model-specifically on the basis of a model.

If the articulation angle α is not known, i.e. is not measured by an articulation angle sensor 24 or cannot be ascertained sufficiently reliably from driving dynamics data, it can be ascertained from the individual images 8-i from the cameras 5-i and with the aid of image processing algorithms. In this regard, from the individual images 8-i, a tracking algorithm can be implemented, in the case of which, therefore, external objects 30 captured in the individual images 8-i are ascertained in the individual images 8-i, in accordance with FIG. 3 therefore e.g. an external distinctive object 30 present in the right capture regions 7-2 and 7-5 firstly in the individual image 8-2 and upon further travel subsequently in the individual image 8-5; this can be done by tracking, and/or the position determination of the respectively adjacent components, e.g. also by means of a KLT tracker and/or a model-based approach.

In this case, it is possible firstly to assess the overlap regions 9-i by assessing the matching of the overlap regions 9-i by way of the calculation of a normalized cross-correlation coefficient, i.e. a measure of the matching of the individual images 8-i in the overlap regions 9-i, or the so-called matching of distinctive points of objects 30 in the projections (top views) and the determination of the position images with respect to one another.

Consequently, the assignment of the individual images, e.g. 8-2 and 8-5, can be effected in such a way that the overlap or the overlap region 9-25 between them is ascertained, and accordingly also an overlap angle. The articulation angle α can then accordingly be ascertained therefrom by means of a model.

Figure 4:
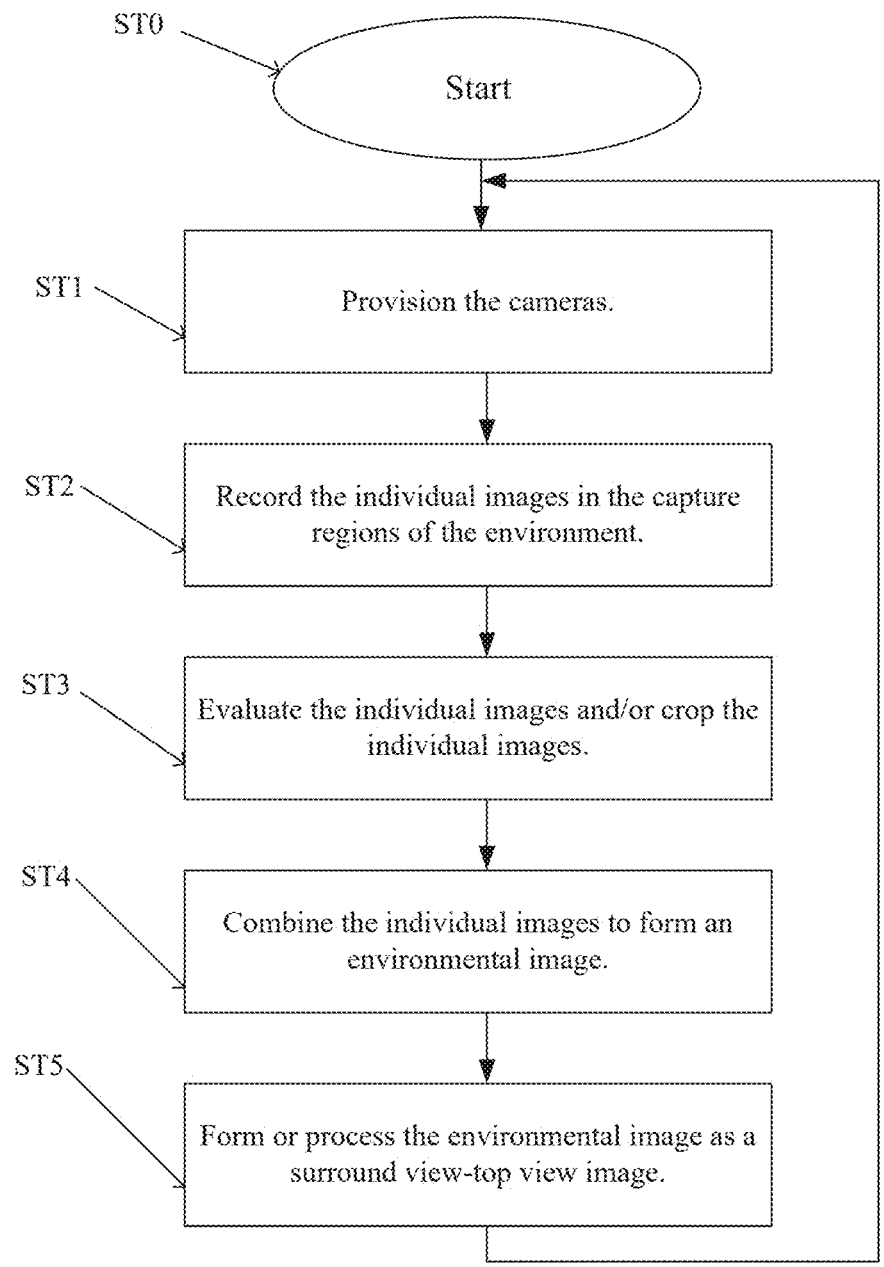
FIG. 4 shows a flow diagram of a method according to an embodiment of the invention.

The method according to an embodiment of the invention thus has the following steps in accordance with FIG. 4:

After the start in step ST0 and the provision—in principle already provided on the vehicle—of the cameras 5-i in step ST1, subsequently step ST2 involves recording the individual images 8-i in the capture regions 7-i of the environment 4, wherein in step ST0 in principle it is also possible to recognize or decide whether e.g. only a surround view-top view image 10*a* of the tractor vehicle 2 is to be produced, or a trailer vehicle 3 is provided, such that an environmental image of the entire vehicle 1 is to be ascertained, accordingly without the rear cameras 5-4*a* and 5-4*b* of the tractor vehicle 2.

Step ST3 then involves evaluating the individual images 8-i and/or cropping the individual images 8-i, and step ST4 involves combining the individual images 8-i to form an environmental image, which can be done by first of all projection to form projections and subsequent stitching or first stitching and then projection, thus resulting in the formation of overlap regions 9-i between the individual images 8-i, which are correspondingly calculated. If the articulation angle α is available, the overlap regions 9-i can be constituted directly from the individual images 8-i; if the articulation angle α is not available, overlap regions 9-i can be ascertained by iteratively forming superimpositions of the individual images 8-i and e.g. assessing the overlap regions 9-i thus formed by means of a cross-correlation coefficient, or by means of matching on the basis of external objects 30 captured during travel or other external reference variables.

Subsequently, in this embodiment, step ST5 involves forming or processing the environmental image 10 as a surround view-top view image 10*a*, preferably in a color pixel representation for distinguishably reproducing different objects 30.

Consequently, in step ST5, e.g. individual external objects 30 can be recognized and correspondingly marked in the surround view-top view image 10*a*, in particular by means of colored representation of the different objects, which the observer generally perceives as a pleasant representation.

The method is then subsequently reset to step ST1.

In principle, the surround view can already be created as a top view in step ST4, such that e.g. the conversion in step ST5 is obviated, or step ST5 then involves only the representation of the captured external objects in e.g. a colored reproduction.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

1 Entire multi-part vehicle, e.g. semitrailer truck
2 Tractor vehicle, e.g. tractor of the semitrailer truck 1
3 Trailer vehicle, e.g. semitrailer
2-5 Right lateral region of the tractor vehicle 2
2-6 Left lateral region of the tractor vehicle 2
2-12 Front side of the tractor vehicle 2
2-13 Rear region of the tractor vehicle 2
3-5 Right lateral surface of the trailer vehicle 3
3-6 Left lateral surface of the trailer vehicle 3
3-12 Front side of the trailer vehicle 3
3-13 Rear region of the trailer vehicle 3
4 Environment
5-$i$, i=1-10 Cameras, where i indicates the ith camera:
5-1 Front camera of the tractor vehicle 2
5-2 Right front lateral camera of the tractor vehicle 2
5-3 Left front lateral camera of the tractor vehicle 2
5-8 Right back lateral camera of the tractor vehicle 2
5-9 Left back lateral camera of the tractor vehicle 2
5-10 Optionally provided front camera of the trailer vehicle 3
5-4$a$ and 5-4$b$ Rear cameras of the tractor vehicle 2:
5-4$a$ Front rear camera of the tractor vehicle 2
5-4$b$ Back rear camera of the tractor vehicle 2
5-5 Right back lateral camera of the trailer vehicle 3
5-6 Left back lateral camera of the trailer vehicle 3
5-7 Rear camera of the trailer vehicle 3
6 Image capture device
7-$i$, i=1-7 Capture regions of the cameras 5-$i$, where i indicates the ith region
7-1 Front capture region
7-2 and 7-5 Capture regions on the right side of the entire vehicle 1
7-3 and 7-6 Capture regions on the left side of the entire vehicle 1
7-4 Back capture region
7-7 Rear capture region
8-$i$, i=1-9 Individual images from the cameras 5-$i$, where i indicates the ith image
8-1 Front individual image
8-2, 8-3 Front lateral individual images
8-4$a$, 8-4$b$ Individual images of the rear cameras 5-4$a$, 5-4$b$,
8-5, 8-6 Lateral individual images of the trailer vehicle 3
8-7 Back individual image of the trailer vehicle 3
8-8 and 8-9 Individual images from the cameras 5-8 and 5-9
9-12, 9-13, 9-25, 9-36, 9-57, 9-67 Overlap regions of the individual images
10$a$ Surround view-top view image, in particular with color data
15 Perspective projection region of the rear region 2-13 of the tractor vehicle 2
16 Image evaluation device
16$a$ Projection device
16$b$ Stitching device
17 Display device, e.g. display
21 Kingpin
22 Kingpin receptable
23$a$, 23$b$ Back corner regions of the trailer vehicle 3
24 Articulation angle sensor
30 External objects
40 Environment-capture system
60 Articulation angle
β Steering angle
K2, K3 Distances in FIG. 2
xyz Basic coordinate system of the tractor vehicle 2

The invention claimed is:

1. A method for producing an environmental image of an entire multi-part vehicle having a tractor vehicle and at least one trailer vehicle, the method comprising:
providing an image capture device comprising:
a front camera on a front side of the tractor vehicle for capturing a front capture region in front of the tractor vehicle and outputting a front individual image,
front lateral cameras on the tractor vehicle for capturing front lateral capture regions and outputting front lateral individual images,
a front rear camera provided on the tractor vehicle for capturing a front side of the trailer vehicle,
back lateral cameras on the trailer vehicle for capturing back lateral capture regions and outputting back lateral individual images, and
a rear camera on a rear region of the trailer vehicle for capturing a back capture region behind the trailer vehicle and outputting a back individual image;
recording the individual images with the cameras;
evaluating and/or cropping the individual images such that overlap regions are in each case formed at least between the front lateral individual images and the back lateral individual images; and
combining the individual images to form the environmental image and/or matching of the individual images in the overlap regions, which represents an environment around the entire vehicle, taking account of an articulation angle of the trailer vehicle relative to the tractor vehicle about an articulation axis disposed forward of at least one axle of the tractor vehicle,
wherein the articulation angle is ascertained using an image from the front rear camera of the front side of the trailer vehicle and based on the relative position of the front side of the trailer vehicle relative to the tractor vehicle.

2. The method as claimed in claim 1, wherein:
the environmental image of the entire vehicle is combined as a surround view-top view image, or
after combining the individual images to form the environmental image of the entire vehicle, a surround view-top view image as a top view of the vehicle environment around the entire vehicle is subsequently formed from the environmental image.

3. The method as claimed in claim 1, wherein the environmental image of the entire vehicle proceeds in closed fashion peripherally around the entire vehicle and/or
the environment is represented in closed fashion peripherally around the entire vehicle.

4. The method as claimed in claim 1, wherein the overlap regions are formed between:
the front individual image and the two front lateral individual images of the tractor vehicle, and/or
between the back individual image and the back lateral individual images.

5. The method as claimed in claim 1, wherein the overlap regions are fixed portions of the individual images and/or independent of the articulation angle.

6. The method as claimed in claim 1, wherein the front lateral cameras are positioned in or on the tractor vehicle such that their lateral front capture regions in each case extend forward beyond the tractor vehicle and backward beyond a rear region of the tractor vehicle backward, and
wherein the back lateral cameras are positioned in or on the trailer vehicle such that their back lateral capture regions extend backward beyond a back rear region of the trailer vehicle and forward beyond a front surface of the trailer vehicle.

7. The method as claimed in claim 1, wherein:
the front lateral capture regions extend backward along a lateral region of the tractor vehicle or without a lateral dead space on the trailer vehicle, and
the back lateral capture regions extend forward along a lateral region of the trailer vehicle and/or without a dead space on the tractor vehicle, and
lateral overlap regions are formed which begin without a dead space on lateral surfaces of the tractor vehicle and of the trailer vehicle.

8. The method as claimed in claim 1, wherein the lateral overlap regions are ascertained from the front lateral individual images and the back lateral individual images depending on the articulation angle,
wherein the articulation angle is further ascertained:
by an articulation angle sensor, and/or
from driving dynamics data, the driving dynamics data including one or more of:
wheel rotational speeds of the tractor vehicle and of the trailer vehicle, a measured yaw rate, a measured transverse acceleration and/or an ascertained steering angle with ascertainment of the temporal profile of the ascertained variables.

9. The method as claimed in claim 1, wherein
the lateral overlap regions are ascertained from the lateral front individual images and the lateral back individual images without knowledge of the articulation angle, and the articulation angle between the tractor vehicle and the trailer vehicle is subsequently ascertained from the ascertained overlap regions.

10. The method as claimed in claim 1, wherein
the overlap regions are ascertained depending on matching of adjacent left individual images or right individual images by image processing algorithms.

11. The method as claimed in claim 1, wherein the lateral overlap regions are ascertained by comparing temporal sequences of lateral individual images.

12. The method as claimed in claim 1, wherein the matching of the lateral individual images is ascertained from the individual images and/or from the individual images of the ascertained top views.

13. The method as claimed in claim 1, wherein top views are first produced from the individual images and subsequently the environmental image of the entire vehicle is ascertained from the top views.

14. The method as claimed in claim 1, wherein the environmental image of the entire vehicle represents the environment around the entire vehicle without gaps and/or without a dead space and/or continuously.

15. The method as claimed in claim 1, wherein the individual images and/or the environmental image of the entire vehicle and/or the surround view-top view image are/is produced with color data for representing captured external objects.

16. The method as claimed in claim 1, wherein the environmental image of the entire vehicle is formed without including a backwardly directed rear camera of the tractor vehicle and/or without including a front camera of the trailer vehicle provided on the front side of the trailer vehicle.

17. The method as claimed in claim 1, wherein the lateral individual images are trimmed depending on the articulation angle and/or ascertained matching, in order to form suitable overlap regions.

18. The method as claimed in claim 1, wherein determining the relative position of the front side of the trailer vehicle and/or of a pattern on the trailer vehicle relative to the tractor vehicle is based on the output of an image processing algorithm that received, as an input, the image, the image being of the front side of the trailer vehicle captured by the front rear camera.

19. The method as claimed in claim 1, wherein the tractor vehicle comprises a forward region and a rearward region, wherein the rearward region comprises the at least one axle, and wherein the front rear camera is provided at a rearward extent of the forward region and backwardly directed to face the rearward region of the tractor vehicle.

20. The environment-capture system for carrying out the method as claimed in claim 1, the environment-capture system comprising:
a front camera on a front side of a tractor vehicle;
a left front lateral camera on a left lateral region of the tractor vehicle;
a right front lateral camera on a right lateral region of the tractor vehicle;
a rear camera of a trailer vehicle, on a rear region of the trailer vehicle;
a left back lateral camera of the trailer vehicle, on a left lateral region of the trailer vehicle and a right back lateral camera of the trailer vehicle, on a right lateral region of the trailer vehicle,
wherein the cameras are provided for capturing capture regions of the environment around the entire vehicle and for producing individual images and forming at least lateral overlap regions; and
an image evaluation device for recording the individual images, trimming the individual images and producing the environmental image of the entire vehicle, which reproduces the environment.

21. The environment-capture system as claimed in claim 20, further comprising an articulation angle sensor for ascertaining the articulation angle.

22. An entire multi-part vehicle having a tractor vehicle, a trailer vehicle and the environment-capture system as claimed in claim 20.

\* \* \* \* \*